(12) United States Patent
Jung et al.

(10) Patent No.: US 11,396,459 B2
(45) Date of Patent: Jul. 26, 2022

(54) PORTABLE WATER BOTTLE HAVING A UV LIGHT STERILIZATION MODULE

(71) Applicant: SEOUL VIOSYS CO., LTD., Gyeonggi-do (KR)

(72) Inventors: Woong Ki Jung, Gyeonggi-do (KR); Byeong Cheol Joo, Gyeonggi-do (KR); Jae Young Choi, Gyeonggi-do (KR)

(73) Assignee: SEOUL VIOSYS CO., LTD., Gyeonggi-do (KR)

( * ) Notice: Subject to any disclaimer, the term of this patent is extended or adjusted under 35 U.S.C. 154(b) by 1 day.

(21) Appl. No.: 16/830,756

(22) Filed: Mar. 26, 2020

(65) Prior Publication Data
US 2020/0223717 A1    Jul. 16, 2020

Related U.S. Application Data

(63) Continuation of application No. PCT/KR2018/010768, filed on Sep. 13, 2018.

(30) Foreign Application Priority Data

Sep. 26, 2017   (KR) .................. 10-2017-0124295

(51) Int. Cl.
*C02F 1/32* (2006.01)
*A47G 19/22* (2006.01)

(52) U.S. Cl.
CPC .......... *C02F 1/325* (2013.01); *A47G 19/2272* (2013.01); *C02F 2201/326* (2013.01);
(Continued)

(58) Field of Classification Search
CPC ...... C02F 1/72; C02F 1/78; C02F 1/48; C02F 1/46; A61L 2/10; B01D 32/34; B01D 61/10; B01D 61/08
See application file for complete search history.

(56) References Cited

U.S. PATENT DOCUMENTS 4,297,222 A * 10/1981 Takeguchi ............. A01K 63/04
                                                  210/167.22
2013/0319915 A1   12/2013 Gellibolian et al.
(Continued)

FOREIGN PATENT DOCUMENTS

CN    206314926 U  *  7/2017
CN    206314926 U     7/2017
(Continued)

OTHER PUBLICATIONS

KR-20170001535-U: May 2017, KR,: Han English translation (Year: 2017).*
(Continued)

*Primary Examiner* — Walter D. Griffin
*Assistant Examiner* — Cameron J Allen
(74) *Attorney, Agent, or Firm* — Burris Law, PLLC

(57) ABSTRACT

A portable water bottle includes a water bottle body having water stored therein; and a sterilizing module for irradiating the inside of the water bottle body with sterilizing ultraviolet rays. The sterilizing module further includes a housing having an ultraviolet outlet through which the sterilizing ultraviolet rays pass; a light source module for emitting the sterilizing ultraviolet rays; and a power storage member for supplying power to the light source module.

20 Claims, 10 Drawing Sheets

(52) U.S. Cl.
CPC .............. *C02F 2201/3228* (2013.01); *C02F 2201/4615* (2013.01); *C02F 2303/04* (2013.01); *C02F 2307/02* (2013.01)

(56) References Cited

U.S. PATENT DOCUMENTS

| | | | | |
|---|---|---|---|---|
| 2015/0053624 A1* | 2/2015 | Maiden | .................. | C02F 1/325 210/748.11 |
| 2016/0251238 A1* | 9/2016 | Matlack | .................. | A61L 2/10 250/372 |
| 2017/0057841 A1 | 3/2017 | Blood et al. | | |

FOREIGN PATENT DOCUMENTS

| | | | | |
|---|---|---|---|---|
| KR | 1020130045884 | | 5/2013 | |
| KR | 101296848 | | 8/2013 | |
| KR | 101670350 | | 12/2016 | |
| KR | 20170001535 U | * | 5/2017 | |
| KR | 2020170001535 | | 5/2017 | |
| KR | 1020170072720 | | 6/2017 | |
| WO | 2014108953 A1 | | 7/2014 | |
| WO | WO-2014187524 A1 | * | 11/2014 | .............. C02F 1/325 |
| WO | 2015147439 | | 10/2015 | |
| WO | WO-2015147439 A1 | * | 10/2015 | .............. H02S 40/38 |

OTHER PUBLICATIONS

International Search Report for International Application PCT/KR2018/010768, dated Dec. 24, 2018.
Office Action dated May 24, 2021 in Chinese counterpart Application No. 201880009185.9, with an English translation thereof.
European Search Report issued in corresponding EP Application No. 18860639.6, dated May 27, 2021.
English translation of Office Action issued in corresponding CN Application No. 201880009185.9, dated Jan. 4, 2022, 7 pages.

* cited by examiner

PORTABLE WATER BOTTLE HAVING A UV LIGHT STERILIZATION MODULE

CROSS-REFERENCE OF RELATED APPLICATIONS

This application is a continuation of PCT Application No. PCT/KR2018/010768, filed on Sep. 13, 2018, which claims priority under 35 U.S.C. § 119 of Korean Patent Application No. 10-2017-0124295, filed on Sep. 26, 2017. The disclosure of the PCT Application No. PCT/KR2018/010768 and Korean Patent Application No. 10-2017-0124295 are hereby incorporated by reference in their entirety.

TECHNICAL FIELD

Embodiments of the present disclosure relate to a portable water bottle and, more particularly, to a portable water bottle having a UV light sterilization module.

BACKGROUND

Ultraviolet (UV) light exhibit different properties depending on wavelength and a sterilization apparatus using such properties of UV light is available. The sterilization apparatus using UV light generally employs a mercury (Hg) lamp. The sterilization apparatus performs sterilization using ozone ($O_3$) generated by wavelengths emitted from the mercury lamp. However, the mercury (Hg) lamp contains mercury, thereby causing environmental pollution when used for a long period of time.

SUMMARY

Embodiments of the present disclosure provide a portable water bottle that can be conveniently carried by a user and allows sterilization of water therein.

Embodiments of the present disclosure provide a portable water bottle that can prevent a user from being exposed to sterilization UV light. In accordance with one embodiment of the present disclosure, a portable water bottle includes a bottle body storing water therein and a sterilizing module emitting sterilization UV light into the bottle body. The sterilizing module includes a housing having a UV outlet through which the sterilization UV light passes; a light source module emitting the sterilization UV light; and a power storage member supplying electric power to the light source module.

According to embodiments of the present disclosure, the portable water bottle is manufactured by coupling a wireless sterilizing module and a bottle body and can be conveniently carried by a user.

According to embodiments of the present disclosure, the portable water bottle can control operation of a sterilization light source emitting sterilization UV light using a sensor, thereby preventing a user from being exposed to the sterilization UV light.

BRIEF DESCRIPTION OF DRAWINGS

FIG. 1 is a perspective view of the assembled portable water bottle according to the first embodiment of the present disclosure;

FIG. 2 is an exploded perspective view of the portable water bottle according to the first embodiment of the present disclosure.

FIG. 3 is a sectional view of a sterilizing module of the portable water bottle according to the first embodiment of the present disclosure.

FIG. 4 is a sectional view of the portable water bottle according to the first embodiment of the present disclosure.

FIG. 5 and FIG. 6 are different cross-sectional views of examples of the sterilization light source.

Figure 1:
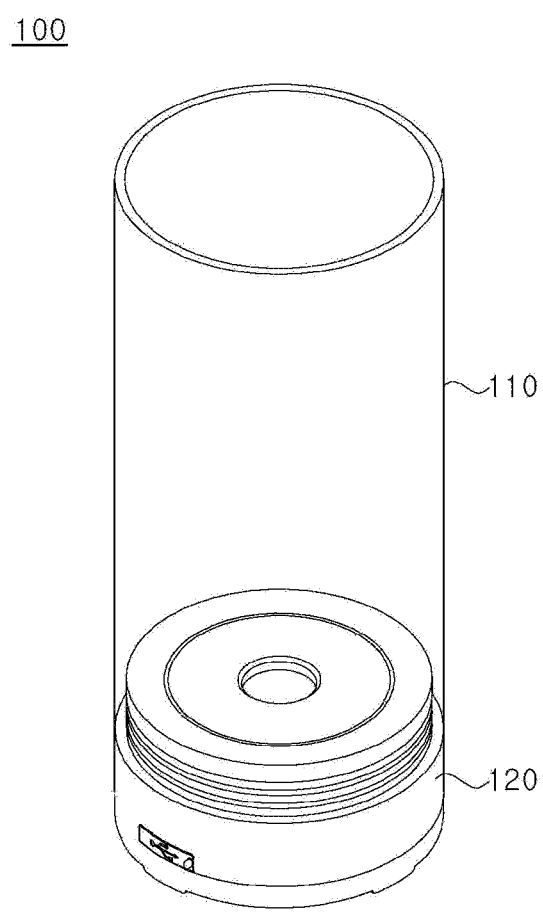
FIG. 1 to FIG. 6 are views of a portable water bottle according to a first embodiment of the present disclosure.

Hereinafter, embodiments of the present disclosure will be described in detail with reference to the accompanying drawings. The following embodiments are provided by way of example so as to fully convey the spirit of the present disclosure to those skilled in the art. Accordingly, the present disclosure is not limited to the embodiments disclosed herein and can also be implemented in different forms. In the drawings, widths, lengths, thicknesses, and the like of elements or components can be exaggerated for clarity and descriptive purposes. Throughout the specification, like reference numerals denote like elements having the same or similar functions.

DETAILED DESCRIPTION

According to embodiments of the present disclosure, a portable water bottle includes a bottle body storing water therein and a sterilizing module emitting sterilization UV light into the bottle body. The sterilizing module includes a housing having a UV outlet through which the sterilization UV light passes; a light source module emitting the sterilization UV light; and a power storage member supplying electric power to the light source module.

In some embodiments, the light source module may include a substrate and a sterilization light source disposed on an upper surface of the substrate and emitting sterilization UV light. The sterilizing module may be disposed at an upper portion or a lower portion of the bottle body. The portable water bottle may further include a transparent window disposed between the UV outlet and the light source module to divide an interior of the housing from an exterior of the housing.

In other embodiments, the portable water bottle may further include a transparent window seat formed along a circumference of the UV outlet on an upper surface of the interior of the housing and receiving the transparent window seated thereon. The portable water bottle may further include an interior sealing member disposed on the transparent window seat and sealing a gap between the UV outlet and the transparent window.

In some embodiments, a side surface of the transparent window may be inserted into an inner surface of the interior sealing member to secure the transparent window to the interior sealing member. The interior sealing member may include a first interior sealing member disposed between the upper surface of the housing and the transparent window; and a second interior sealing member disposed between the transparent window and the light source module. The interior sealing member may be formed of a silicone material.

In some embodiments, the bottle body may further include a body coupling portion coupled to at least a portion of the sterilizing module. The body coupling portion may be formed on an inner surface of the bottle body. Alternatively, or additionally, the bottle body may further include a breakaway prevention portion formed at an upper portion of the body coupling portion and preventing the sterilizing module from being inserted into the bottle body by a predetermined depth or more.

In some embodiments, the breakaway prevention portion may be formed of a material allowing transmission of the sterilization UV light therethrough. The breakaway prevention portion may have a through-hole formed therein. The body coupling portion may include threads formed on the inner surface of the bottle body.

The sterilizing module may further include a module coupling portion composed of threads formed on an outer surface of a portion of the housing inserted into the body coupling portion to couple the module coupling portion to the body coupling portion.

In some embodiments, the portable water bottle may further include an exterior sealing member disposed between the breakaway prevention portion and the sterilizing module and sealing a gap between the breakaway prevention portion and the sterilizing module. The exterior sealing member may be formed of a silicone material. The portable water bottle may further include a connection terminal formed on the housing and connecting the power storage member to an external power source.

In other embodiments, the sterilizing module may further include a timer controlling a sterilization time. The sterilizing module may further include an input unit setting a sterilization time. The sterilizing module may further include an output unit outputting at least one selected from among a sterilization start time, a sterilization stop time, and a remaining sterilization time.

Alternatively, or additionally, the portable water bottle may further include a sensor sensing at least one selected from among water stored in the bottle body, user gesture, and operation of the bottle body or the sterilizing module. Here, the sterilization light source may emit sterilization UV light or may stop emission of the sterilization UV light depending on a sensing result of the sensor.

An inner wall of the bottle body may be formed of a material preventing transmission of the sterilization UV light therethrough. Alternatively, the inner wall of the bottle body may include a material reflecting the sterilization UV light.

The power storage member may be capable of being charged with electric power and may include at least one selected from among a first power storage member secured inside the sterilizing module and a second power storage member detachably secured to the sterilizing module.

Embodiments of the present disclosure relate to a portable water bottle that can be conveniently carried by a user and can sterilize water stored therein.

FIG. 1 to FIG. 6 are views of a portable water bottle according to a first embodiment of the present disclosure.

Figure 2:
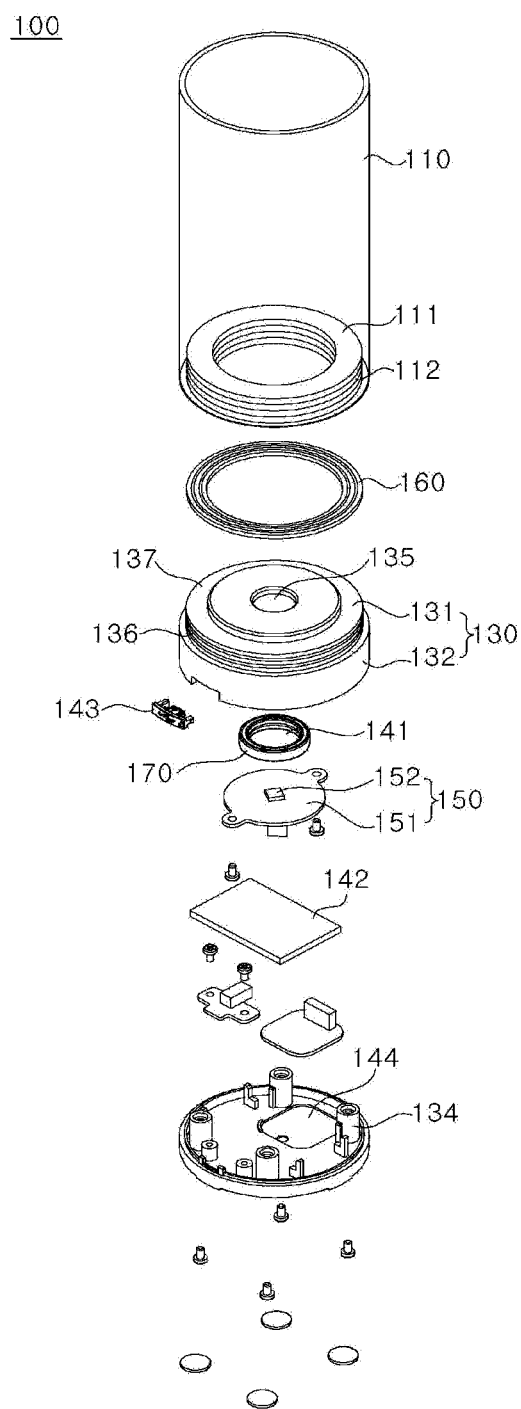
Figure 3:
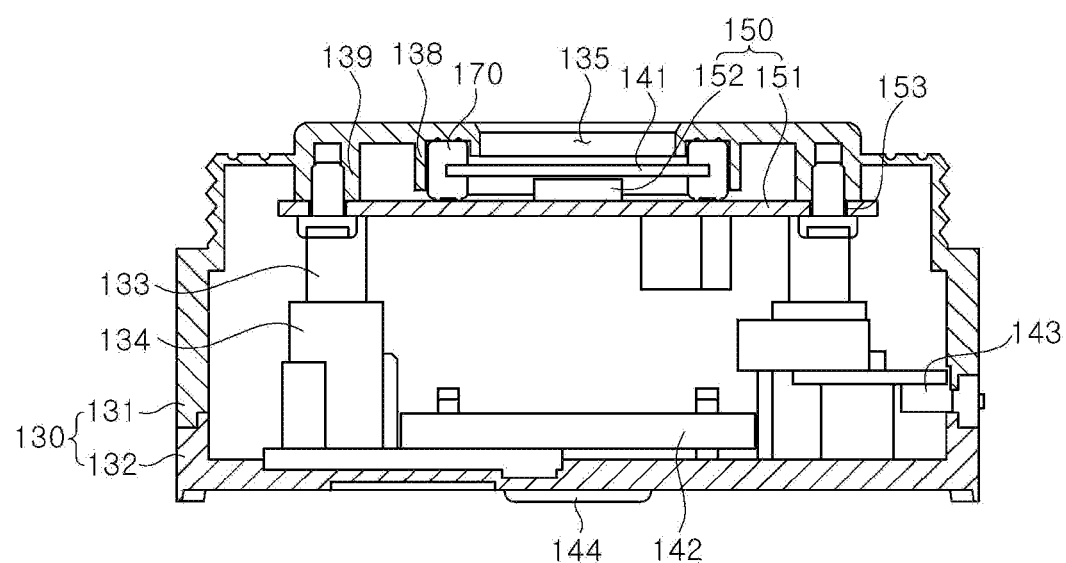
Figure 4:
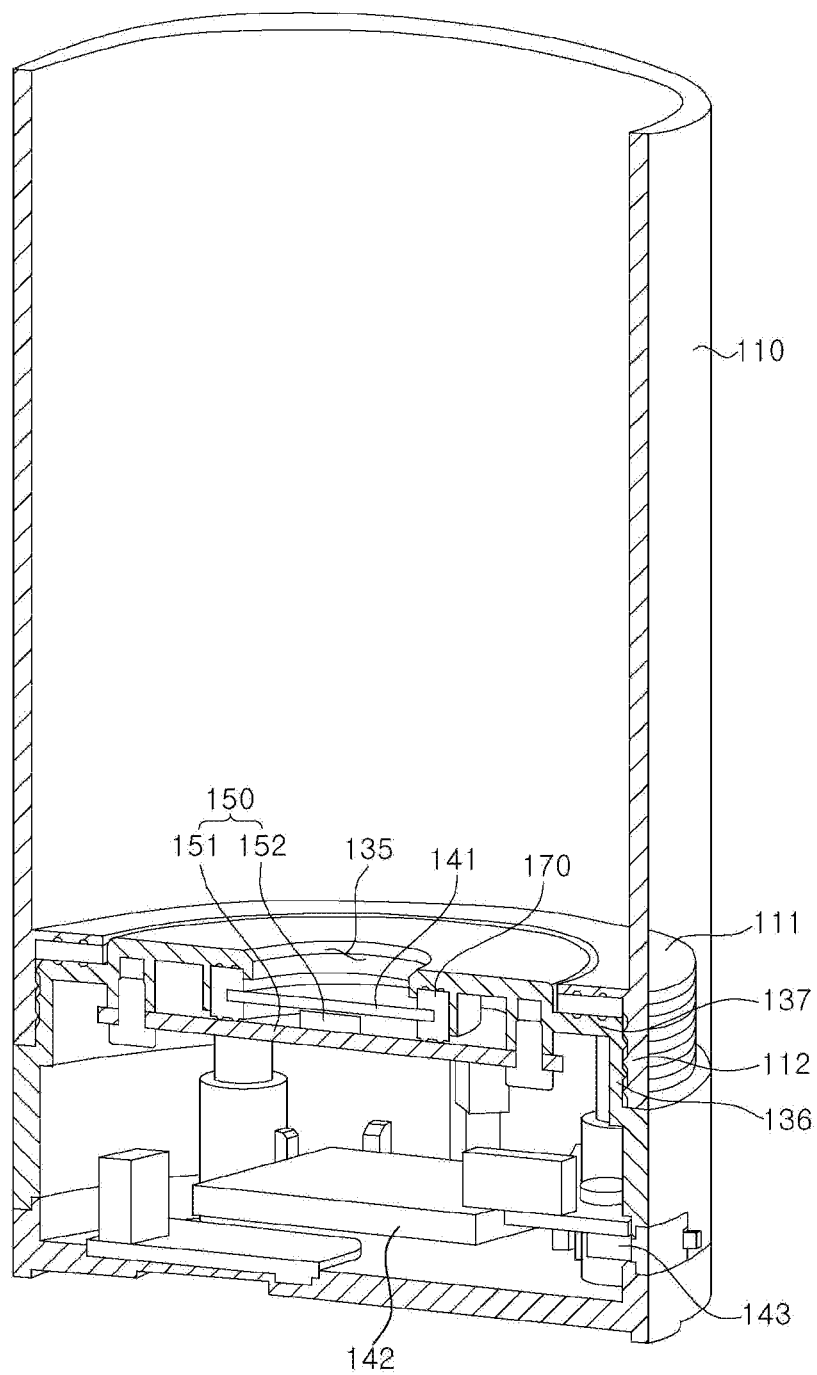
Figure 5:
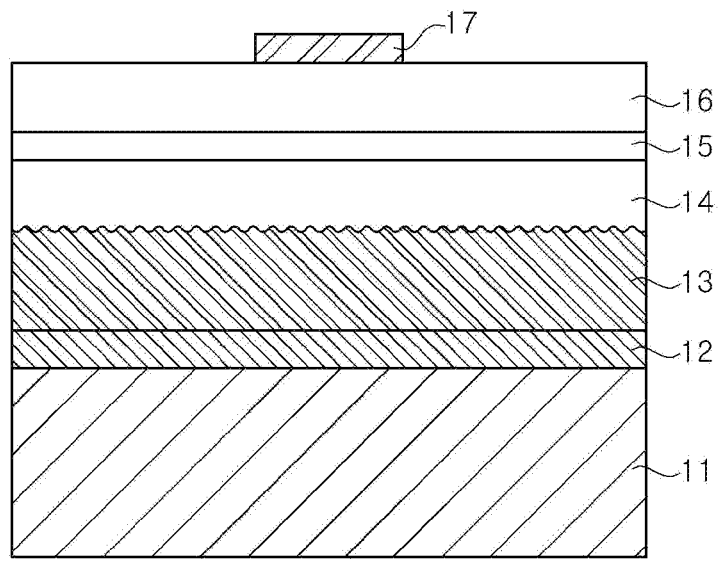
Figure 6:
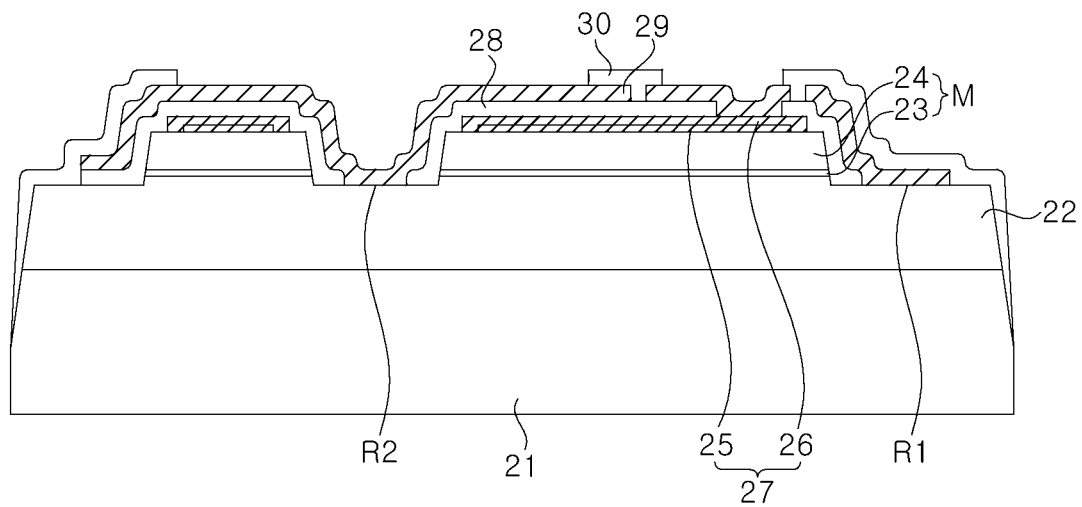

FIG. 1 is a perspective view of the assembled portable water bottle according to the first embodiment of the present disclosure. FIG. 2 is an exploded perspective view of the portable water bottle according to the first embodiment of the present disclosure. FIG. 3 is a sectional view of a sterilizing module of the portable water bottle according to the first embodiment of the present disclosure. FIG. 4 is a sectional view of the portable water bottle according to the first embodiment of the present disclosure. FIG. 5 and FIG. 6 are different cross-sectional views of examples of the sterilization light source.

According to the first embodiment, the portable water bottle 100 includes a bottle body 110 and a sterilizing module 120. In some embodiments, the bottle body 110 stores water. In other embodiments, the bottle body 110 stores other forms of liquid that have similar properties of water. According to this embodiment, the bottle body 110 has a structure open at a lower side thereof. The sterilizing module 120 is coupled to an open portion of the bottle body 110 to define a space in the bottle body 110 such that water can be stored in the space inside the bottle body 110.

The bottle body 110 is formed therein with a breakaway prevention portion 111. The breakaway prevention portion 111 protrudes from an inner surface of the bottle body 110 in an inward direction. The breakaway prevention portion 111 is formed along the inner surface of the bottle body 110 to form a hollow space therein. The breakaway prevention portion 111 prevents the sterilizing module 120 from being moved out of a predetermined location when the sterilizing module 120 is inserted into the bottle body 110 and coupled to a body coupling portion 112. When the sterilizing module 120 is coupled to the body coupling portion 112, an upper surface of the sterilizing module 120 contacts a lower surface of the breakaway prevention portion 111. That is, the breakaway prevention portion 111 prevents the sterilizing module 120 from being detached from the bottle body 110 by restricting an insertion depth of the sterilizing module 120 into the bottle body 110.

The breakaway prevention portion 111 is formed at a lower side thereof with the body coupling portion 112. The body coupling portion 112 is coupled to the sterilizing module 120. When the body coupling portion 112 is coupled to the sterilizing module 120, which is in turn secured to the bottle body 110. For example, the body coupling portion 112 may be threads formed on an inner wall of the bottle body 110. Various other structures or mechanism may be used for the body coupling portion 112.

Since the bottle body 110 stores water therein, the inner wall of the bottle body 110 is formed of a corrosion resistant material. Further, the inner wall of the bottle body 110 may be coated with a material not allowing transmission of sterilization UV light therethrough. Since the sterilization UV light cannot pass through the bottle body 110, the water bottle can prevent the sterilization UV light from affecting the health conditions of a user carrying the portable water bottle 100. Alternatively, the inner wall of the bottle body 110 may be coated with a reflective material reflecting the sterilization UV light. The sterilization UV light is reflected from the inner wall of the bottle body 110 toward the water stored in the bottle body 110, thereby improving efficiency in sterilization of water. In other embodiments, the bottle body 110 per se may be formed of the material not allowing transmission of the sterilization UV light or the reflective material reflecting the sterilization UV light.

Referring to FIG. 2, the sterilizing module 120 includes a housing 130, a transparent window 141, a light source module 150, and a power storage member 142.

The housing 130 includes a first housing 131 and a second housing 132. According to this embodiment, the first housing 131 constitutes an upper surface and a side surface of the housing 130, and the second housing 132 constitutes a lower surface of the housing 130. The transparent window 141, the light source module 150 and the power storage member 142 are disposed in a space defined by the first housing 131 and the second housing 132. The first housing 131 is formed with a first coupling portion 133 protruding downwards from an upper surface thereof and the second housing 132 is formed with a second coupling portion 134 protruding upwards from a lower surface thereof. The first housing 131 is coupled to the second housing 132 by inserting one end of the first coupling portion 133 into the second coupling portion 134. As shown in FIG. 3, a portion of the second housing 132 on which the second coupling portion 134 is formed and the second coupling portion 134 may be formed in a penetrated structure. Here, a screw may be inserted into a penetrated portion of the second housing 132 to be fastened to the first coupling portion 133 through the second coupling portion 134. This structure can improve coupling force between the first housing 131 and the second housing 132.

Referring to FIGS. 2 and 3, the first housing 131 is formed with a UV outlet 135 having a penetrated structure. The UV outlet 135 is a path through which sterilization UV light emitted from the light source module 150 is discharged outside the sterilizing module 120. With the bottle body 110 coupled to the sterilizing module 120, water stored in the bottle body 110 is irradiated with the sterilization UV light emitted through the UV outlet 135. The UV outlet 135 may have a diameter determined in consideration of a beam angle of the sterilization UV light emitted from the light source module 150. In addition, the entirety or a portion of an inner surface of the first housing 131 defining the UV outlet 135 may have a tapered structure. The tapered structure can reduce loss of the sterilization UV light due to collision with the inner surface of the first housing 131 while the sterilization UV light passes through the UV outlet 135.

In addition, the inner surface of the first housing 131 defining the UV outlet 135 may be formed of a reflective material reflecting the sterilization UV light or may be coated with the reflective material. Upon collision with the inner surface of the first housing 131, the sterilization UV light can be reflected from the inner surface of the first housing 131 and pass through the UV outlet 135. Accordingly, the sterilization UV light may not be lost on the inner surface of the first housing 131 and is reflected toward the interior of the bottle body 110. Sterilization efficiency of the portable water bottle 100 may improve.

The housing 130 is formed on an outer surface thereof with a module coupling portion 136. The module coupling portion 136 is formed on an outer surface of an upper portion of the first housing 131 inserted into the bottle body 110. For example, the module coupling portion 136 may be composed of threads corresponding to the body coupling portion 112 of the bottle body 110. In other embodiments, various other structures than threads are available.

Accordingly, the module coupling portion 136 of the sterilizing module 120 is inserted into the body coupling portion 112 of the bottle body 110 and screwed thereto. In this way, the bottle body 110 is coupled to the sterilizing module 120 such that water can be stored in the bottle body 110.

Referring back to FIG. 2, an exterior sealing member 160 may be disposed between the breakaway prevention portion 111 of the bottle body 110 and the sterilizing module 120. The exterior sealing member 160 seals a gap between the breakaway prevention portion 111 and the sterilizing module 120 to prevent water stored in the bottle body 110 from leaking from the portable water bottle 100.

The exterior sealing member 160 is formed between the breakaway prevention portion 111 and the sterilizing module 120 to surround the circumference of the inner surface of the breakaway prevention portion 111 and the circumference of the UV outlet 135. The exterior sealing member 160 is formed of an elastic material. For example, the exterior sealing member 160 may be formed of a silicone material.

The sterilizing module 120 includes an exterior sealing member seat 137 on which the exterior sealing member 160 is seated. The exterior sealing member seat 137 is formed on an upper surface of the sterilizing module 120 to surround the circumference of the UV outlet 135. In addition, the exterior sealing member seat 137 may have a smaller height than the upper surface of the sterilizing module 120 on which the UV outlet 135 is formed. That is, the upper surface of the sterilizing module 120 may have a stepped structure in which the UV outlet 135 has a different height from the exterior sealing member seat 137. With the stepped structure of the upper surface of the sterilizing module 120, the portable water bottle 100 can prevent the exterior sealing member 160 from being detached from a predetermined location.

In addition, the stepped structure of the sterilizing module 120 allows the upper surface of the sterilizing module 120 having the UV outlet 135 formed thereon to be placed inside the breakaway prevention portion 111 or above the breakaway prevention portion 111. Accordingly, the distance between the sterilizing module 120 and the space storing water therein is stored can be reduced, thereby improving sterilization efficiency of the portable water bottle 100.

Further, the breakaway prevention portion 111, the exterior sealing member seat 137 and the exterior sealing member 160 are formed to have sufficient contact areas, thereby improving a waterproofing function of the portable water bottle 100.

The housing 130 is formed therein with a transparent window seat 138, as shown in FIG. 3. The transparent window seat 138 defines a space on which the transparent window 141 is seated. The transparent window seat 138 protrudes downwards from the upper surface of the first housing 131 while surrounding the periphery of the UV outlet 135. The transparent window seat 138 is provided with the transparent window 141 and an interior sealing member 170.

The transparent window 141 is formed of a material allowing transmission of the sterilization UV light therethrough. For example, the transparent window 112 (see FIG. 4) may be formed of at least one selected from among quartz, a poly(methyl methacrylate) (PMMA) resin, and a fluorine-based polymer resin. With a side surface of the transparent window 141 inserted into an inner surface of the interior sealing member 170, the transparent window 141 may be seated on the transparent window seat 138.

The interior sealing member 170 is formed to surround the side surface of the transparent window 141. The interior sealing member 170 is provided to waterproof the sterilizing module 120 and seals a gap between the transparent window 141 and the transparent window seat 138. The interior sealing member 170 is formed of an elastic material. For example, the interior sealing member 170 is formed of a silicone material.

In addition, a thickness of the interior sealing member 170 from an upper surface of the interior sealing member 170 to a lower surface thereof may be the same as or slightly greater than a height of the transparent window seat 138 protruding from the upper surface of the first housing 131.

The housing 130 is formed therein with a light source module fastening portion 139 as shown in FIG. 3. The light source module fastening portion 139 serves to hold the sterilizing module 120 inside the housing 130. The light source module fastening portion 139 is formed to protrude downwards from the upper surface of the first housing 131. The light source module 150 emits sterilization UV light capable of sterilizing water. The light source module 150 includes a substrate 151 and a sterilization light source 152, as shown in FIG. 2.

The substrate 141 is electrically connected to the sterilization light source 142 to supply electric power to the sterilization light source 142. For example, the substrate 141 may be a printed circuit board (PCB), a metal substrate, a ceramic substrate, or the like. That is, the substrate 141 may be selected from any kind of substrate that can be electrically connected to the sterilization light source 142.

The sterilization light source 152 is mounted on an upper surface of the substrate 141, as shown in FIG. 3. The sterilization light source 152 emits sterilization UV light. For example, the sterilization light source 152 is a light emitting diode chip that emits sterilization UV light. The sterilization UV light emitted from the sterilization light source 152 may be UV light in any wavelength band capable of sterilizing water.

For example, the sterilization light source 142 may be a light emitting diode having a structure shown in FIG. 5.

Referring to FIG. 5, compound semiconductor layers including a first conductivity type semiconductor layer 14, an active layer 15, and a second conductivity type semiconductor layer 16 are formed on a conductive substrate 11. Here, the first conductivity type semiconductor layer 14 is an N-type semiconductor layer and the second conductivity type semiconductor layer 16 is a P-type semiconductor layer. The conductive substrate 11 may be a substrate formed of Si, GaAs, GaP, AlGaInP, Ge, SiSe, GaN, AlInGaN or InGaN, or a substrate formed of Al, Zn, Ag, W, Ti, Ni, Au, Mo, Pt, Pd, Cu, Cr, Fe, or alloys thereof. The compound semiconductor layers are III-N-based compound semiconductor layers.

In some embodiments, the first conductivity type semiconductor layer 14 may be subjected to a roughening process. Accordingly, light generated from the active layer can be reflected from an interface of the first conductivity type semiconductor layer 14 subjected to the roughening process.

A metal reflective layer 13 is interposed between the compound semiconductor layers and the conductive substrate 11. The metal reflective layer 13 is formed of a material having high reflectivity, for example, silver (Ag) or aluminum (Al).

On the other hand, a bonding layer 12 may be interposed between the metal reflective layer 13 and the conductive substrate 11 to prevent the conductive substrate 11 from being separated from the metal reflective layer 13 by enhancing bonding force between the conductive substrate 11 and the metal reflective layer 13.

Although not shown in the drawings, an anti-diffusion layer may be interposed between the bonding layer 12 and the metal reflective layer 13. The anti-diffusion layer can maintain reflectivity of the metal reflective layer 13 by preventing metal elements from diffusing from the bonding layer 12 or the conductive substrate 11 to the metal reflective layer 13.

An electrode pad 17 is disposed on an upper surface of the compound semiconductor layers to be opposite to the conductive substrate 11. With this structure, electric current can be supplied to the semiconductor layers through the conductive substrate 11 and the electrode pad 17 to emit light.

In a typical light emitting diode, since a P-type semiconductor layer having a small thickness is formed on the conductive substrate, current leakage occurs at a bonding interface between the conductive substrate and the P-type semiconductor layer, thereby causing deterioration in luminous efficacy. However, in the light emitting diode shown in FIG. 6, the first conductivity type semiconductor layer 14, that is, the N-type semiconductor layer, is formed on the conductive substrate 11, thereby solving the problems of the typical light emitting diode suffering from current leakage and deterioration in luminous efficacy.

Alternatively, the sterilization light source 152 may be a light emitting diode having a structure shown in FIG. 6.

Referring to FIG. 6, the light emitting diode may include a first conductivity type semiconductor layer 22, a mesa M including an active layer 23 and a second conductivity type semiconductor layer 24, a first insulating layer 28, a first electrode 29, and a second insulating layer 30, and may further include a growth substrate 21 and a second electrode 27. The growth substrate 21 may be selected from any substrate enabling growth of the first conductivity type semiconductor layer 22, the active layer 23, and the second conductivity type semiconductor layer 24 thereon. For example, the growth substrate 21 may be a sapphire substrate, a silicon carbide substrate, a gallium nitride substrate, an aluminum nitride substrate, a silicon substrate, or the like. A side surface of the growth substrate 21 may include an inclined surface, thereby improving extraction of light generated in the active layer 23.

The second conductivity type semiconductor layer 24 may be disposed on the first conductivity type semiconductor layer 22 and the active layer 23 may be disposed between the first conductivity type semiconductor layer 22 and the second conductivity type semiconductor layer 24.

The first conductivity type semiconductor layer 22 may include n-type dopants and the second conductivity type semiconductor layer 24 may include p-type dopants, or vice versa. The active layer 23 may include a multi-quantum well (MQW) structure.

The light emitting diode may include at least one mesa M which includes the active layer 23 and the second conductivity type semiconductor layer 24. In some embodiments, a side surface of the mesa M may be an inclined surface, which improves luminous efficacy of light generated in the active layer 23.

The first conductivity type semiconductor layer 22 may include a first contact region R1 and a second contact region R2 exposed through the mesa M. The first electrode 29 may be electrically connected to the first conductivity type semiconductor layer 22 in the first contact region R1 and the second contact region R2. The first contact region R1 may be disposed around the mesa M along an outer circumference of the first conductivity type semiconductor layer 22. In addition, the second contact region R2 may be at least partially surrounded by the mesa M. With this structure, electric current can flow along the outer circumference of the light emitting diode at the center thereof, thereby reducing forward voltage through effective distribution of the electric current.

The second electrode 27 may be disposed on the second conductivity type semiconductor layer 24 and may be electrically connected thereto. The second electrode 27 may include a reflective metal layer 25 formed on the second conductivity type semiconductor layer 24 and a barrier metal layer 26 covering upper and side surfaces of the reflective metal layer 26.

The first insulating layer 28 may be disposed between the first electrode 29 and the mesa M. The first electrode 29 may be insulated from the mesa M and the first electrode 29 may be insulated from the second electrode 27 through the first insulating layer 28. The first insulating layer 28 may partially expose the first contact region R1 and the second contact region R2. The first insulating layer 28 may have an opening that exposes the second electrode 27. The second electrode 27 may be electrically connected to pads or bumps (not shown) through the opening.

The second insulating layer 30 may adjoin a portion of the first contact region R1. Specifically, the second insulating layer 30 may cover the first contact region R1 exposed through the first electrode 29. In addition, the second insulating layer 30 may cover at least part of the first electrode 29.

The structure of the sterilization light source 152 has been described with reference to FIG. 5 and FIG. 6. However, it should be understood that the structure of the sterilization light source 152 is not limited to the structure shown in FIG. 5 and FIG. 6. The sterilization light source 152 may be any kind of light emitting diode having any structure so long as the sterilization light source 152 can emit sterilization UV light.

The substrate 151 is formed with fastening holes 153. The fastening holes 153 are formed at locations corresponding to the light source module fastening portion 139 of the housing 130 when the light source module 150 is disposed inside the housing 130. For example, the sterilizing module 120 may be secured to the interior of the housing 130 by screw fastening. That is, one end of a screw is fastened to the light source module fastening portion 139 through each of the fastening holes 153 of the substrate 151.

When the sterilization light source 152 is secured to the housing 130, the upper surface of the substrate 151 may press the interior sealing member 170. The interior sealing member 170 may more reliably seal the gap between the upper surface of the first housing 131 and the transparent window 141 while being pressed on the upper surface of the first housing 131 by the substrate 151.

In this way, the light source module 150 is secured to the housing 130 while pressing the interior sealing member 170 on which the transparent window 141 is mounted, thereby waterproofing the UV outlet 135.

The power storage member 142 supplies electric energy to interior components of the sterilizing module 120 for operation of the sterilizing module 120. That is, the power storage member 142 supplies electric energy to the light source module 150. The power storage member 142 may accumulate chemical energy obtained through conversion of the electric energy supplied from an external power source. In addition, the power storage member 142 may convert the accumulated chemical energy into electric energy to supply the electric energy to other components. The power storage member 142 may be a secondary battery capable of repeating such charge and discharge operations. In this way, since the power storage member 142 can repeat charge and discharge, the portable water bottle 100 can sterilize water even without being connected to an external power source. That is, the power storage member 142 enables convenient carrying of the portable water bottle 100. For example, the power storage member 142 may be selected from any secondary battery, such as a NiCd battery, a lithium ion battery, a polymer battery, a nickel hydrogen battery, and the like.

Alternatively, the power storage member 142 may be a primary battery previously charged and not allowing recharging. When the power storage member 142 is the primary battery, the power storage member 142 is replaced by a new power storage member 142 after being discharged. For example, the power storage member 142 may be any primary battery, such as a typical dry battery.

When the power storage member 142 is the primary battery, the first housing 131 may be coupled to the second housing 132 by other coupling methods allowing easy separation and coupling instead of screw coupling. For example, the first housing 131 and the second housing 132 may be secured in a coupled state only by inserting the second coupling portion 134 of the second housing 132 into the first coupling portion 133 of the first housing 131. Alternatively, the first housing 131 or the second housing 132 may be formed with an inlet through which the power storage member 142 can be replaced.

In the drawings, the sterilizing module 120 is illustrated as including one power storage member 142. Alternatively, the sterilizing module 120 may include a plurality of power storage members 142. The sterilizing module 120 may include a first power storage member 142' and a second power storage member 142". Here, the first power storage member 142' may be a secondary battery and the second power storage member 142" may be a primary battery. The sterilizing module 120 may receive electric power supplied from one of the first power storage member 142' and the second power storage member 142" depending on circumstances. For example, when the first power storage member 142' supplying electric power to the sterilizing module 120 is discharged, the sterilizing module 120 may receive electric power supplied from the second power storage member 142".

The housing 130 of the sterilizing module 120 is formed with a connection terminal 143. The connection terminal 143 is an input unit through which electric current supplied from an external power source (not shown) is supplied to the power storage member 142. The connection terminal 143 may be directly connected to the power storage member 142 or may be connected thereto through the substrate 151 of the light source module 150 or through a separate substrate (not shown). For example, the connection terminal 143 may be selected from any terminals for power charge, such as a universal serial bus (USB) terminal, a cigar jack, and the like.

Further, the housing 130 of the sterilizing module 120 is formed with a power switch 144. The power switch 144 controls electric power supplied from the power storage member 142 to the light source module 150 such that the sterilizing module 120 emits sterilization UV light or stops emission of the sterilization UV light. The power switch 144 may send a signal to the substrate 151 of the light source module 150 to control power supply of the light source module 150.

The power switch 144 may be operated by any methods capable of controlling power connection between the power storage member 142 and the light source module 150. For example, the power switch 144 may be a switch to which at least one mechanism of a push mechanism, a toggle mechanism, a slide mechanism and a touch mechanism is applied.

Detailed description of a lid (not shown) that covers an upper portion of the portable water bottle 100 according to this embodiment is omitted. The presence and structure of the lid can be modified in various ways according to selection of those skilled in the art.

In the following description, description of the same components as those described above will be omitted. For description of the omitted components, the above description can be referred.

Figure 7:
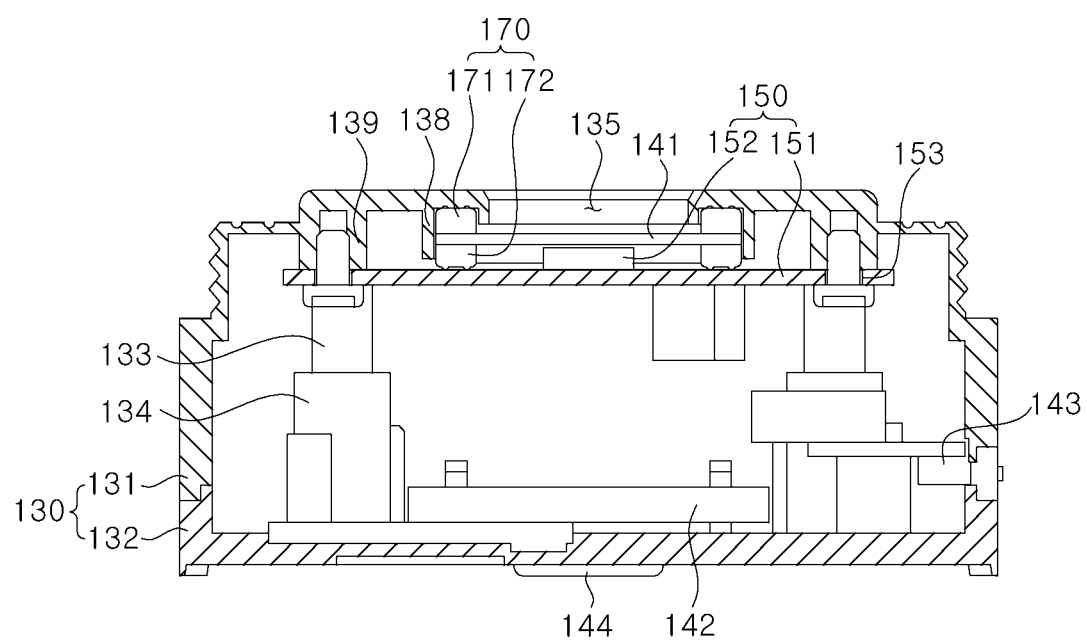
FIG. 7 is a sectional view of another embodiment of an interior sealing member of a sterilizing module according to the present disclosure.

FIG. 7 is a sectional view of another embodiment of the interior sealing member of the sterilizing module according to the present disclosure. The interior sealing member 170 may include a first interior sealing member 171 and a second interior sealing member 172. The first interior sealing member 171 and the second interior sealing member 172 are disposed on the transparent window seat 138. The first interior sealing member 171 and the second interior sealing member 172 are formed of an elastic material.

The first interior sealing member 171 is disposed between an upper surface of the housing 130 and the transparent window 141. Further, the second interior sealing member 172 is disposed between the transparent window 141 and the substrate 151 of the light source module 150.

When the light source module 150 is secured to the housing 130, the substrate 151 presses the second interior sealing member 172 in an upward direction. That is, the second interior sealing member 172, the transparent window 141 and the first interior sealing member 171 are pressed on the upper surface of the housing 130 to be brought into close contact with one another by the substrate 151. Since the first interior sealing member 171 and the second interior sealing member 172 are formed of an elastic material, the first interior sealing member 171 and the second interior sealing member 172 seal the gap between the UV outlet 135 and the transparent window 141, thereby waterproofing the sterilizing module 120.

Figure 8:
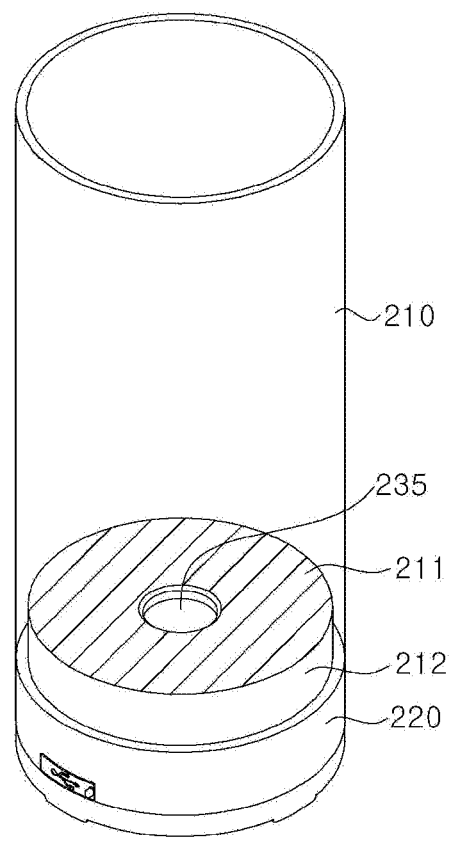
FIG. 8 is a perspective view of a portable water bottle according to a second embodiment of the present disclosure.

FIG. 8 is a perspective view of a portable water bottle according to a second embodiment of the present disclosure. The following description will focus on different features of the portable water bottle 200 according to the second embodiment from the portable water bottle 100 according to the first embodiment. Referring to FIG. 8, the portable water bottle 200 according to the second embodiment includes a bottle body 210 and a sterilizing module 220.

Unlike the portable water bottle 100 of the first embodiment, the bottle body 210 according to this embodiment has a closed lower surface. That is, a breakaway prevention portion 211 is formed to seal the bottle body 210 instead of having a penetrated structure. Accordingly, water can be stored in the bottle body 210 even in a state wherein the bottle body 210 is not coupled to the sterilizing module 220.

The breakaway prevention portion 211 is formed at a lower side thereof with a body coupling portion 212. An upper portion of the sterilizing module 220 is inserted into the body coupling portion 212. That is, the upper portion of the sterilizing module 220 is inserted into a space between inner surfaces of the bottle body 210 that constitutes the body coupling portion 212.

The breakaway prevention portion 211 disposed to face a UV outlet 235 of the sterilizing module 220 is formed of a material allowing transmission of UV light therethrough. For example, the breakaway prevention portion 211 may be formed of quartz. Alternatively, not only the breakaway prevention portion 211 but also the entirety of the lower surface of the bottle body 210 may be formed of the material allowing transmission of UV light therethrough.

The sterilizing module 220 has a stepped upper surface. FIG. 8 shows the sterilizing module 220 partially inserted into the body coupling portion 212. Alternatively, the sterilizing module 220 may be formed in a smaller size than the body coupling portion 212 such that the entirety of the sterilizing module 220 can be inserted into the body coupling portion 212. With the structure where the sterilizing module 220 has a smaller size than the body coupling portion 212, the sterilizing module 220 may have a flat upper surface instead of the stepped upper surface.

According to this embodiment, since the portable water bottle 200 can store water only with the bottle body 210, a user can carry the bottle body 210 alone. As such, since the bottle body 210 excluding the sterilizing module 220 can be carried alone by a user, it is possible to carry the portable water bottle 200 with reduced weight.

Figure 9:
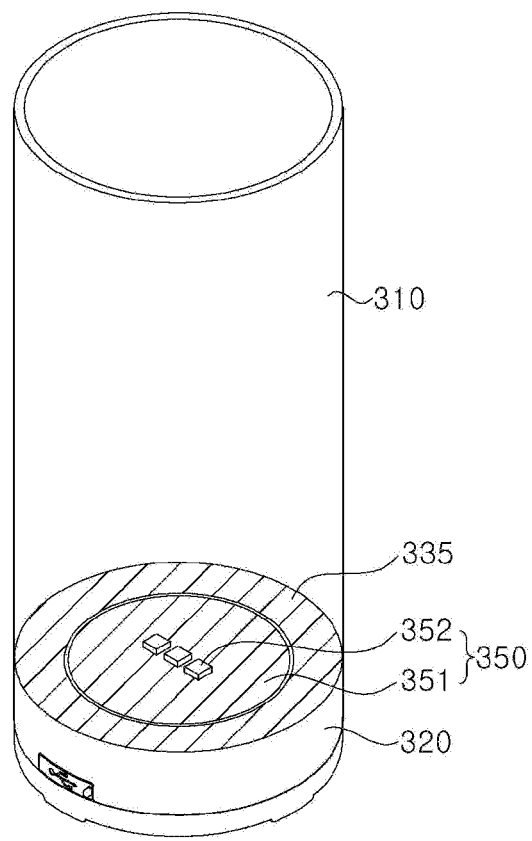
FIG. 9 is a perspective view of a portable water bottle according to a third embodiment of the present disclosure.

FIG. 9 is a perspective view of a portable water bottle according to a third embodiment of the present disclosure. The following description will focus on different features of the portable water bottle 300 according to the third embodiment from the portable water bottles 100, 200 according to the first and second embodiments.

Referring to FIG. 9, the portable water bottle 300 according to the third embodiment includes a bottle body 310 and a sterilizing module 320.

The bottle body 310 has a closed lower surface and is formed to have a flat structure. Even without the sterilizing module 320, the bottle body 310 can store water therein. In addition, since the bottle body 310 has a flat lower surface, it is possible to prevent the bottle body 310 from falling down due to slight impact or vibration when the bottle body 310 is placed on a floor. The entirety of the lower surface of the bottle body 310 or a portion of the bottle body 310 facing a UV outlet 335 of the sterilizing module 320 may be formed of a material allowing transmission of sterilization UV light therethrough.

The sterilizing module 320 may have a flat upper surface. Accordingly, a UV outlet 335 of the sterilizing module 320 may be formed in a large size, as needed. Since the UV outlet 335 has a large size, a greater number of sterilization light sources 352 can be disposed on the substrate 351. Even with a broad irradiation range through emission of sterilization UV light from many sterilization light sources 352, the UV outlet 335 is formed in a large size, thereby reducing loss of the sterilization UV light through collision with the interior of the sterilizing module 320. That is, the interior of the bottle body 310 can be sufficiently irradiated with the sterilization UV light emitted in a broad range from many sterilization light sources 352. Accordingly, the portable water bottle 300 can sterilize water stored therein with a large magnitude of the sterilization UV light, thereby improving sterilization efficiency through reduction in sterilization time.

Furthermore, the portable water bottle 300 according to this embodiment can store water only with the bottle body 310. As such, since the bottle body 310 excluding the sterilizing module 320 can be carried alone by a user, it is possible to carry the portable water bottle 300 with reduced weight.

Figure 10:
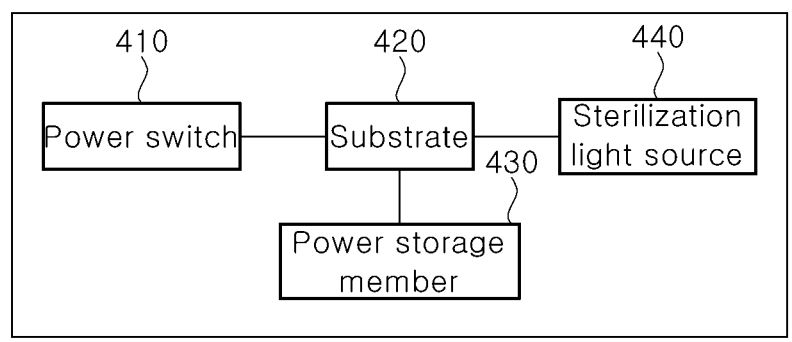
FIG. 10 is a schematic block diagram of a sterilizing module according to a first embodiment of the present disclosure.

FIG. 10 is a schematic block diagram of the sterilizing module according to a first embodiment of the present disclosure. Referring to FIG. 10, a sterilizing module 400 includes a power switch 410, a substrate 420, a power storage member 430, and a sterilization light source 440.

In some embodiments, the power switch 410 generates a start signal and a stop signal. The start signal and the stop signal are generated by the power switch 410 in response to input signals from the outside. For example, when a user touches the power switch 410, the power switch 410 generates the start signal. Then, when the user touches the power switch 410 again, the power switch 410 generates the stop signal. A method of sending the signals to the power switch 410 corresponding to the start signal and the stop signal may be changed depending on the kind of power switch 410.

Upon reception of the start signal from the power switch 410, the substrate 420 supplies electric power stored in the power storage member 430 to the sterilization light source 440. Upon reception of the stop signal from the power switch 410, the substrate 420 stops power supply to the sterilization light source 440.

Upon reception of electric power through the substrate 420, the sterilization light source 440 emits sterilization UV light. In addition, the sterilization light source 440 stops emission of the sterilization UV light when power supply through the substrate 420 is stopped. The sterilizing module 400 according to the first embodiment can be conveniently controlled through manipulation of the power switch 410.

Figure 11:
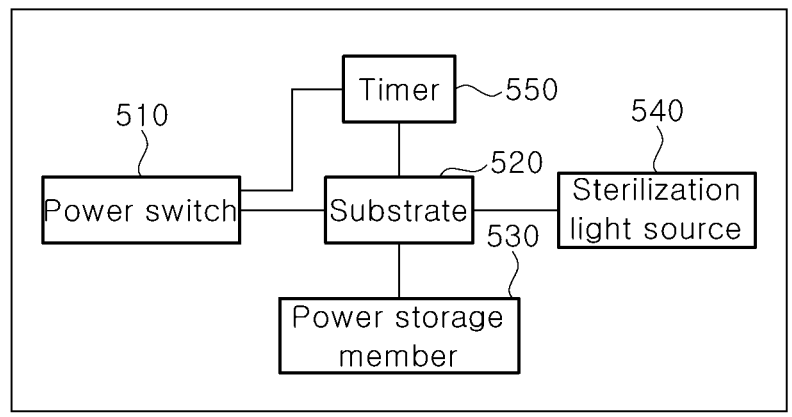
FIG. 11 is a schematic block diagram of a sterilizing module according to a second embodiment of the present disclosure.

FIG. 11 is a schematic block diagram of a sterilizing module according to a second embodiment of the present disclosure. A sterilizing module 500 according to the second embodiment includes a power switch 510, a timer 550, a substrate 520, a power storage member 530, and a sterilization light source 540.

The power switch 510 generates a start signal and a stop signal in response to input signals from the outside. The power switch 510 may send the start signal to the timer 550. Upon reception of the start signal, the timer 550 may send a sterilization start signal to the substrate 520.

Upon reception of the sterilization start signal, the substrate 520 supplies electric power from a power storage member 530 to the sterilization light source 540. Further, the timer 550 sends a sterilization stop signal to the substrate 520 after a preset sterilization time. Upon reception of the sterilization stop signal, the substrate 520 stops power supply of the sterilization light source 540. The power switch 510 may send the stop signal to at least one selected from among the timer 550 and the substrate 520.

Upon reception of the stop signal, the timer 550 may send the sterilization stop signal to the substrate 520 even when the preset sterilization time has not elapsed. Upon reception of the stop signal, the substrate 520 stops power supply of the sterilization light source 540 even when the substrate 520 does not receive the sterilization stop signal from the timer 550.

The sterilizing module 500 according to the second embodiment emits sterilization UV light only for a period of sterilization preset by the timer 550. Since the sterilizing module 500 automatically stops sterilization operation after the preset sterilization time, it is possible to reduce power consumption.

Figure 12:
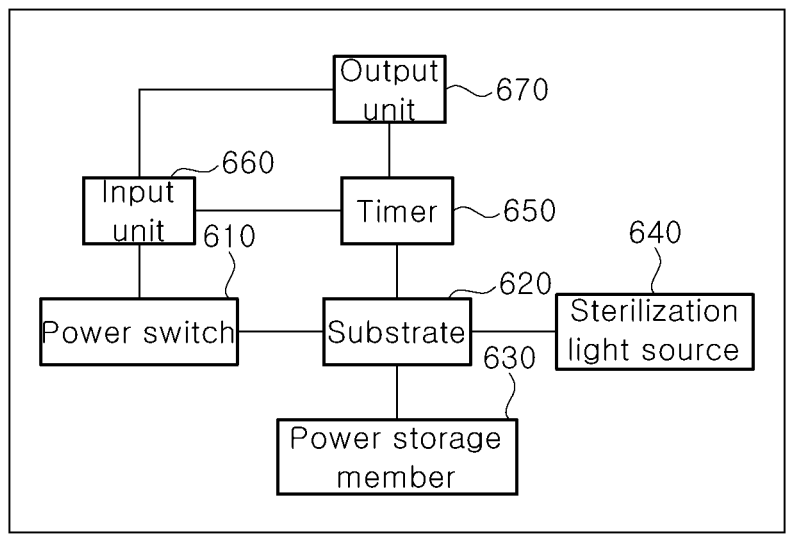
FIG. 12 is a schematic block diagram of a sterilizing module according to a third embodiment of the present disclosure.

FIG. 12 is a schematic block diagram of the sterilizing module according to the third embodiment of the present disclosure. A sterilizing module 600 according to the third embodiment includes a power switch 610, an input unit 660, an output unit 670, a timer 650, a substrate 620, a power storage member 630, and a sterilization light source 640.

The power switch 610 generates a start signal and a stop signal in response to input signals from the outside. The power switch 610 sends the start signal to the input unit 660. The input unit 660 is activated in response to the start signal.

The input unit 660 is a component through which a user inputs a signal. For example, the input unit 660 may be selected from any components enabling input of commands, such as a touch pad, a button, a keypad, and the like.

According to this embodiment, a sterilization time may be set through the input unit 660. The input unit 660 sends data regarding the input sterilization time to the timer 650. The timer 650 sends the sterilization start signal or the sterilization stop signal to the substrate 620 based on the data regarding the sterilization time. The substrate 620 supplies electric power of the power storage member 630 to the sterilization light source 640 or stops power supply thereto in response to the sterilization start signal or the sterilization stop signal sent from the timer 650.

The output unit 670 outputs the data regarding the sterilization time input to the input unit 660 such that a user can monitor the data. In addition, the output unit 670 may output sterilization data, such as a sterilization start time, a sterilization stop time, and a remaining sterilization time, received from the timer 650. For example, the output unit 670 may be a liquid crystal display device. The output unit 670 may be selected from any device capable of visibly or audibly displaying data in the form of text or sound.

The sterilizing module 600 according to the third embodiment allows a user to directly set the sterilization time. Accordingly, the sterilizing module 600 emits sterilization UV light to sterilize water for a period of time set by a user.

Figure 13:
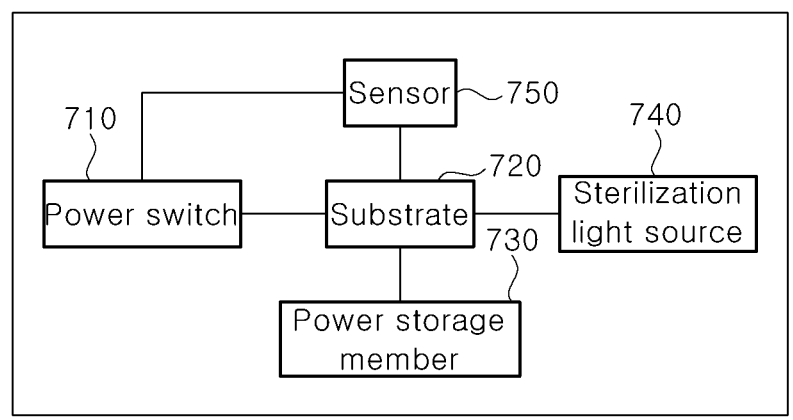
FIG. 13 is a schematic block diagram of a sterilizing module according to a fourth embodiment of the present disclosure.

FIG. 13 is a schematic block diagram of the sterilizing module according to a fourth embodiment of the present disclosure. A sterilizing module 700 according to the fourth embodiment includes a power switch 710, a sensor 750, a substrate 720, a power storage member 730, and a sterilization light source 740. The power switch 710 generates a start signal and a stop signal in response to input signals from the outside. The power switch 710 may send the start signal to the sensor 750.

Upon reception of the start signal, the sensor 750 generates a sterilization start signal or a sterilization stop signal according to the kind of sensor. Then, the sensor 750 sends the sterilization start signal or the sterilization stop signal to the substrate 720. For example, the sensor 750 may be a humidity sensor. The sensor 750 may sense water stored in the portable water bottle. That is, high humidity of the portable water bottle indicates water stored therein and low humidity of the portable water bottle indicates that the portable water bottle is in an empty state. Upon detection of a higher humidity than a preset humidity, the sensor 750 generates and sends the sterilization start signal to the substrate 720. Further, upon detection of a lower humidity than the preset humidity, the sensor 750 generates and sends the sterilization stop signal to the substrate 720. Thus, the portable water bottle may send the sterilization UV light into the portable water bottle only when it is determined based on a sensing result of the humidity sensor that the portable water bottle stores water.

Alternatively, the sensor 750 may be a gyro sensor. The sensor 750 detects an inclination of the portable water bottle to generate the sterilization start signal or the sterilization stop signal.

The sensor 750 generates and sends the sterilization start signal to the substrate 720 when the sterilizing module 700 or the portable water bottle is tilted at an angle less than or equal to a predetermined inclination. In addition, the sensor 750 generates and sends the sterilization stop signal when the sterilizing module 700 or the portable water bottle is tilted at an angle greater than or equal to a predetermined inclination. That is, in order to allow a user to drink water stored in the portable water bottle, the portable water bottle is tilted at a predetermined angle or more. Accordingly, the portable water bottle can prevent a user from being exposed to the sterilization UV light by detecting the inclination of the portable water bottle using the gyro sensor when the user drinks water.

Alternatively, the sensor 750 may be a distance sensor. The sensor 750 detects a distance between the portable water bottle and the body of a user. The sensor 750 may generate the sterilization start signal only when the distance between the portable water bottle and the body of a user is a predetermined distance or longer. In addition, the sensor 750 may generate the sterilization stop signal only when the distance between the portable water bottle and the body of a user is a predetermined distance or less. Accordingly, the portable water bottle can prevent a user from being exposed to the sterilization UV light by emitting the sterilization UV light to water only when it is determined using the distance sensor that the user is away from the portable water bottle.

Alternatively, the sensor 750 may be a gesture sensor or a motion sensor. The sensor 750 detects a user gesture or motion of the portable water bottle. The sensor 750 generates the sterilization start signal or the sterilization stop signal corresponding to the user gesture or the motion of the portable water bottle detected thereby. Accordingly, the portable water bottle can start or stop sterilization of water only through a simple operation based on sensing results of the gesture sensor or the motion sensor even when a user does not input a command for sterilization through the input unit.

Alternatively, the sensor 750 may be an illuminance sensor. The sensor 750 detects the interior illuminance of the portable water bottle to generate the sterilization start signal or the sterilization stop signal. The sensor 750 generates the sterilization start signal when the lid of the portable water bottle is closed, and generates the sterilization stop signal when the lid of the portable water bottle is open. Accordingly, since the portable water bottle emits sterilization UV light only when it is determined based on a sensing result of the illuminance sensor that the lid of the portable water bottle is closed, the portable water bottle can prevent a user from being exposed to the sterilization UV light.

Alternatively, or additionally, the sterilizing module 700 may include at least one selected from the group consisting of the aforementioned sensors and a combination thereof.

The sterilizing module 700 or the portable water bottle may control sterilization start and sterilization stop of the sterilizing module 700 using various other sensors as well as the aforementioned sensors.

Upon reception of the sterilization start signal from the sensor 750, the substrate 720 supplies electric power of the power storage member 730 to the sterilization light source 740. In addition, upon reception of the sterilization stop signal from the sensor 750, the substrate 720 stops power supply from the sterilization light source 740.

According to the fourth embodiment, the sterilizing module 700 automatically performs operation for sterilization start or sterilization stop based on sensing results of the sensor 750 even when a user does not input a separate command for sterilization.

Although not described in the fourth embodiment, the sterilizing module 700 may further include an input unit, an output unit, a timer, and the like.

For example, a preset sterilization time is input through the input unit and the sterilizing module 700 can generate the sterilization start signal or the sterilization operation signal based on sensing results of the sensor 750 detecting the portable water bottle, a user and water stored in the portable water bottle for the preset sterilization time.

Although some embodiments have been described herein with reference to the accompanying drawings, it should be understood that these embodiments are provided for illustration only and are not to be construed in any way as limiting the present disclosure and the scope of the present disclosure should be defined by the appended claims and equivalents thereto.

We claim:

1. A portable water bottle comprising:
    a bottle body having a space storing water, the bottle body comprising:
        a body coupling portion formed on an inner surface thereof; and
        a breakaway prevention portion formed at an upper portion of the body coupling portion; and
    a sterilizing module comprising:
        a housing having a UV outlet through which sterilization UV light passes,
        a light source module emitting the sterilization UV light, the light source module comprising a substrate and a sterilization light source disposed on the substrate and emitting the sterilization UV light; and
        a power storage member supplying electric power to the light source module;
        a window member disposed between the UV outlet and the light source module to divide an interior of the housing from an exterior of the housing; and
        an interior sealing member configured and arranged to seal a gap between the UV outlet and the window member;
    wherein the sterilizing module emits the sterilization UV light into the bottle body;
    the body coupling portion is coupled to at least a portion of the sterilizing module; and
    the breakaway prevention portion prevents the sterilizing module from being inserted into the bottle body by a predetermined depth or more;
    a sensor operable to sense user gesture, operation of the bottle body or the sterilizing module, or a combination thereof; and
    wherein the sterilization light source module emits sterilization UV light, or stops emission of the sterilization UV light depending on a sensing result of the sensor.

2. The portable water bottle according to claim 1, wherein the sterilizing module is disposed at an upper portion or a lower portion of the bottle body.

3. The portable water bottle according to claim 1, further comprising:
    a window seat formed along a circumference of the UV outlet on an upper surface of the interior of the housing, the circumference of the UV outlet configured to receive the window member seated thereon.

4. The portable water bottle according to claim 3, wherein the interior sealing member is disposed on the window seat and sealing the gap between the UV outlet and the window member.

5. The portable water bottle according to claim 4, wherein a side surface of the window member is inserted into an inner surface of the interior sealing member to secure the window member to the interior sealing member.

6. The portable water bottle according to claim 4, wherein the interior sealing member comprises:
    a first interior sealing member disposed between the upper surface of the housing and the window member; and a second interior sealing member disposed between the window member and the light source module.

7. The portable water bottle according to claim 1, wherein the breakaway prevention portion is formed of a material allowing transmission of the sterilization UV light therethrough.

8. The portable water bottle according to claim 1, wherein the breakaway prevention portion has a through-hole formed therein.

9. The portable water bottle according to claim 1, wherein the body coupling portion comprises threads formed on the inner surface of the bottle body.

10. The portable water bottle according to claim 9, further comprising:
a module coupling portion comprising threads formed on an outer surface of a portion of the housing inserted into the body coupling portion to couple the module coupling portion to the body coupling portion.

11. The portable water bottle according to claim 1, further comprising:
an exterior sealing member disposed between the breakaway prevention portion and the sterilizing module and sealing a gap between the breakaway prevention portion and the sterilizing module.

12. The portable water bottle according to claim 1, further comprising:
a connection terminal formed on the housing and connecting the power storage member to an external power source.

13. The portable water bottle according to claim 1, wherein the sterilizing module further comprises a timer controlling a sterilization time.

14. The portable water bottle according to claim 1, wherein the sterilizing module further comprises an input unit setting a sterilization time.

15. The portable water bottle according to claim 1, wherein the sterilizing module further comprises an output unit outputting a sterilization start time, a sterilization stop time, a remaining sterilization time, or a combination thereof.

16. The portable water bottle according to claim 1, wherein an inner wall of the bottle body is formed of a material preventing transmission of the sterilization UV light therethrough.

17. The portable water bottle according to claim 1, wherein an inner wall of the bottle body comprises a material reflecting the sterilization UV light.

18. The portable water bottle according to claim 1, wherein the power storage member is chargeable with electric power and comprises a first power storage member secured inside the sterilizing module, a second power storage member detachably secured to the sterilizing module, or both.

19. A sterilization module for use with a container comprising:
a housing having a UV outlet through which sterilization UV light passes, the housing arranged within a body of a container;
a light source module emitting the sterilization UV light into the body of the container, the light source module comprising a substrate and a sterilization light source disposed on the substrate and emitting the sterilization UV light; and
a power storage member supplying electric power to the light source module;
a window member disposed between the UV outlet and the light source module to divide an interior of the housing from an exterior of the housing;
an interior sealing member configured and arranged to seal a gap between the UV outlet and the window member; and
a sensor operable to sense user gesture, operation of the body of the container or the sterilizing module, or a combination thereof; and
wherein the sterilization light source emits sterilization UV light, or stops emission of the sterilization UV light depending on a sensing result of the sensor.

20. The sterilization module for the container of claim 19, further comprising a power switch operable to send a start signal to the sensor,
wherein upon reception of a power start signal, the sensor generates a sterilization start signal or a sterilization stop signal, and
the sterilization start signal or the sterilization stop signal is correlated to the sensing result of the sensor;
wherein the sensor comprises a humidity sensor, a gyro sensor, a distance sensor, a gesture sensor or a motion sensor, an illuminance sensor, or a combination thereof.

* * * * *